United States Patent
Rieke et al.

(10) Patent No.: US 10,591,595 B2
(45) Date of Patent: Mar. 17, 2020

(54) DETECTION-SYSTEM AND CONTROL METHOD THEREOF

(71) Applicant: Aptiv Technologies Limited, St. Michael (BB)

(72) Inventors: Matthias Rieke, Moenchengladbach (DE); Marcel Fruend, Remscheid (DE)

(73) Assignee: Aptiv Technologies Limited (BB)

( * ) Notice: Subject to any disclaimer, the term of this patent is extended or adjusted under 35 U.S.C. 154(b) by 406 days.

(21) Appl. No.: 15/420,173

(22) Filed: Jan. 31, 2017

(65) Prior Publication Data
US 2017/0285163 A1    Oct. 5, 2017

(30) Foreign Application Priority Data

Mar. 30, 2016 (EP) .................. 16162795.5

(51) Int. Cl.
| | |
|---|---|
| *G01S 7/03* | (2006.01) |
| *H01Q 1/02* | (2006.01) |
| *H05B 6/80* | (2006.01) |
| *H01Q 17/00* | (2006.01) |
| *H01Q 15/00* | (2006.01) |

(Continued)

(52) U.S. Cl.
CPC .............. *G01S 13/931* (2013.01); *G01S 7/03* (2013.01); *G01S 7/032* (2013.01); *G01S 7/4004* (2013.01); *H01Q 1/02* (2013.01); *H01Q 1/3233* (2013.01); *H01Q 1/42* (2013.01); *H01Q 15/0013* (2013.01); *H01Q 17/00* (2013.01); *H01Q 17/007* (2013.01); *H05B 6/686* (2013.01); *H05B 6/80* (2013.01); *G01S 2007/027* (2013.01); *G01S 2007/4043* (2013.01); *G01S 2007/4047* (2013.01); *G01S 2013/9375* (2013.01); *G01S 2013/9378* (2013.01); *G01S 2013/9385* (2013.01); *G01S 2013/9389* (2013.01); *G01S 2013/9392* (2013.01)

(58) Field of Classification Search
None
See application file for complete search history.

(56) References Cited

U.S. PATENT DOCUMENTS 3,889,189 A * 6/1975 Lode .................. G01S 7/32
                                                  368/118
4,060,212 A * 11/1977 Magenheim ........ B64D 15/00
                                                  244/134 D (Continued)

FOREIGN PATENT DOCUMENTS

| CN | 1784929 A | 6/2006 |
|---|---|---|
| CN | 103262339 A | 8/2013 |

(Continued)

*Primary Examiner* — Vladimir Magloire
*Assistant Examiner* — Donald H B Braswell
(74) *Attorney, Agent, or Firm* — Joseph V. Bonadies

(57) ABSTRACT

A detection-system for a vehicle to detect the presence of one or more object relative to the vehicle comprises a module-housing, a radar sensor component located within the module-housing for emitting a radar beam and receiving reflected signals in a detection mode. The radar sensor component comprises means for emitting a defrost beam in a defrost mode; the defrost beam overlapping the radar beam. The detection-system further comprises an absorber material located in the field of view of the defrost beam to absorb the energy of the defrost beam and to warm up in view to provide a defrosting effect.

20 Claims, 7 Drawing Sheets

(51) Int. Cl.
  *H01Q 1/42*   (2006.01)
  *H01Q 1/32*   (2006.01)
  *H05B 6/68*   (2006.01)
  *G01S 7/40*   (2006.01)
  *G01S 13/931* (2020.01)
  *G01S 13/93*  (2006.01)
  *G01S 7/02*   (2006.01)

(56) References Cited

U.S. PATENT DOCUMENTS

| | | | | |
|---|---|---|---|---|
| 5,400,043 | A * | 3/1995 | Arceneaux | H01Q 1/421 |
| | | | | 343/872 |
| 5,528,249 | A * | 6/1996 | Gafford | H01Q 1/425 |
| | | | | 343/700 MS |
| 6,600,103 | B1 * | 7/2003 | Schmidt | G01S 7/032 |
| | | | | 174/559 |
| 6,891,517 | B2 | 5/2005 | Voeltzel | |
| 7,190,326 | B2 | 3/2007 | Voeltzel | |
| 7,397,442 | B2 * | 7/2008 | Hawes | H01Q 1/02 |
| | | | | 343/704 |
| 9,755,299 | B2 | 9/2017 | Lee et al. | |
| 9,837,707 | B2 | 12/2017 | Villarroel et al. | |
| 2004/0140941 | A1 * | 7/2004 | Joy | H01Q 9/16 |
| | | | | 343/795 |
| 2009/0093927 | A1 * | 4/2009 | Mueller-Schneiders | |
| | | | | B60R 16/0232 |
| | | | | 701/36 |
| 2009/0174621 | A1 | 7/2009 | Crouch et al. | |
| 2011/0115686 | A1 * | 5/2011 | Hauhe | H01Q 1/422 |
| | | | | 343/841 |
| 2015/0083863 | A1 * | 3/2015 | Karthauser | B64D 15/00 |
| | | | | 244/134 D |
| 2016/0119509 | A1 * | 4/2016 | Wato | H04N 5/2251 |
| | | | | 348/148 |

FOREIGN PATENT DOCUMENTS

| | | |
|---|---|---|
| DE | 197 24 320 A1 | 12/1998 |
| DE | 199 63 003 A1 | 6/2001 |
| KR | 101144849 B1 * | 5/2012 |

* cited by examiner

DETECTION-SYSTEM AND CONTROL METHOD THEREOF

CROSS-REFERENCE TO RELATED APPLICATION

This application claims the benefit under 35 U.S.C. § 119(a) of European Patent Application EP 16162795.5, filed Mar. 30, 2016, the entire disclosure of which is hereby incorporated herein by reference.

TECHNICAL FIELD OF INVENTION

This disclosure relates to a detection-system that has particular, but not exclusive, application to a detection-system combining defrost feature, such as for, but not limited to, vehicle applications.

BACKGROUND OF INVENTION

Current driver assistant systems are based on a huge amount of sensors. All these sensors have a very good performance in ideal environments. In situations where the sensor field of view is distorted by, for example, rain water, snow, or ice, the performance of these sensors can be limited because of the physical effects. In modern vehicle architecture, there are a lot of use cases for sensors. Frequently used are the front radar, the side radar, and the front camera. Each mounting location has its own requirements to the sensor and also to the surrounding. The front camera is mounted inside the passenger cabin and so there might be the problem of a fogged-up windshield in some cases. To ensure a good sensor view all the time, a windshield heating if often used by vehicle manufacturers. This causes higher product costs for each vehicle and is a possible point of failure. The front radar is a very important device for next generation advanced driver assistance systems. Mostly the radar is mounted directly behind the grill or close to this location. In wintry environments the sensor, respectively the grill in front of the sensor, is exposed to ice and snow. In that case, the radar radiation can be distributed by the water molecules. To avoid this phenomenon, some vehicle manufacturers use an active heating system based on thermal radiation for the radome. This additional hardware cause additional costs and is a possible source of error. Further size reduction is one of the next generation issues and is in conflict with the bringing in of additional components. In the case of radar, there are no known arrangements to avoid icing-up of sensor radome located on the surface of the bumper in the field of view. For next generation advanced driver assistance systems, where autonomous driving will be possible, it is very important to have a 100% availability of all sensors and so it is very important to have no disturbing water, ice, or snow in the field of view.

SUMMARY OF THE INVENTION

It is an object of the invention to provide an improved detection-system that overcomes such problems.

A detection-system for a vehicle to detect the presence of one or more objects relative to the vehicle. The system includes a module-housing, a radar sensor component located within the module-housing for emitting a radar beam and receiving reflected signals in a detection mode. The radar sensor component includes a means for emitting a defrost beam in a defrost mode. The defrost beam overlaps the radar beam. The detection-system further includes an absorber material located in the field of view of the defrost beam to absorb the energy of the defrost beam and to warm up the absorber material to provide a defrosting effect.

Such detection-system gives the advantage of reusing the already available radar signal to melt ice and snow without adding extra additional components and thus does not need extra space to install a heating device.

The absorber material may be arranged on an outer surface of the module-housing. The absorber material may be a metamaterial that absorbs the defrost beam frequency and lets pass through the radar beam frequency. The means of emitting a defrost beam may include a radar frequency divider. The module-housing may further include a micro-controller adapted to operate the radar sensor component in a detection mode, in a defrost mode, or in a combined defrost and detection mode. The detection-system may include the body part of the vehicle wherein the absorber material is thermally coupled to the body part. The body part of the vehicle may be a bumper. The body part of the vehicle may be a windshield. The absorber material may be a translucent material. The module-housing may include a camera component, where the absorber material is located in the field of view of the camera such that the camera component is supervising the progress of the defrosting. The radar beam and the defrost beam may be emitted from different antennas such that a combined defrost and detection mode may be activated. The radar beam and the defrost beam may be emitted from a common antenna such that the defrost mode and the detection mode may be activated separately.

According to the invention, a control method for a detection-system comprises the step of: operating the detection-system in a radar mode by using a radar sensor component to emit a radar beam and to receive reflected radar beam signals; operating the detection-system in a defrost mode by using the radar sensor component to emit a defrost beam toward an absorber material placed in the field of view of the radar beam and thermally coupled with a body part of a vehicle through which the radar beam passes, the defrost beam being suitable for warming up the absorber material and for providing a defrost effect on the body part.

The control method may comprise the step of operating the detection-system in a combined defrost and detection mode by using the radar sensor component to emit simultaneously the radar beam and the defrost beam.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
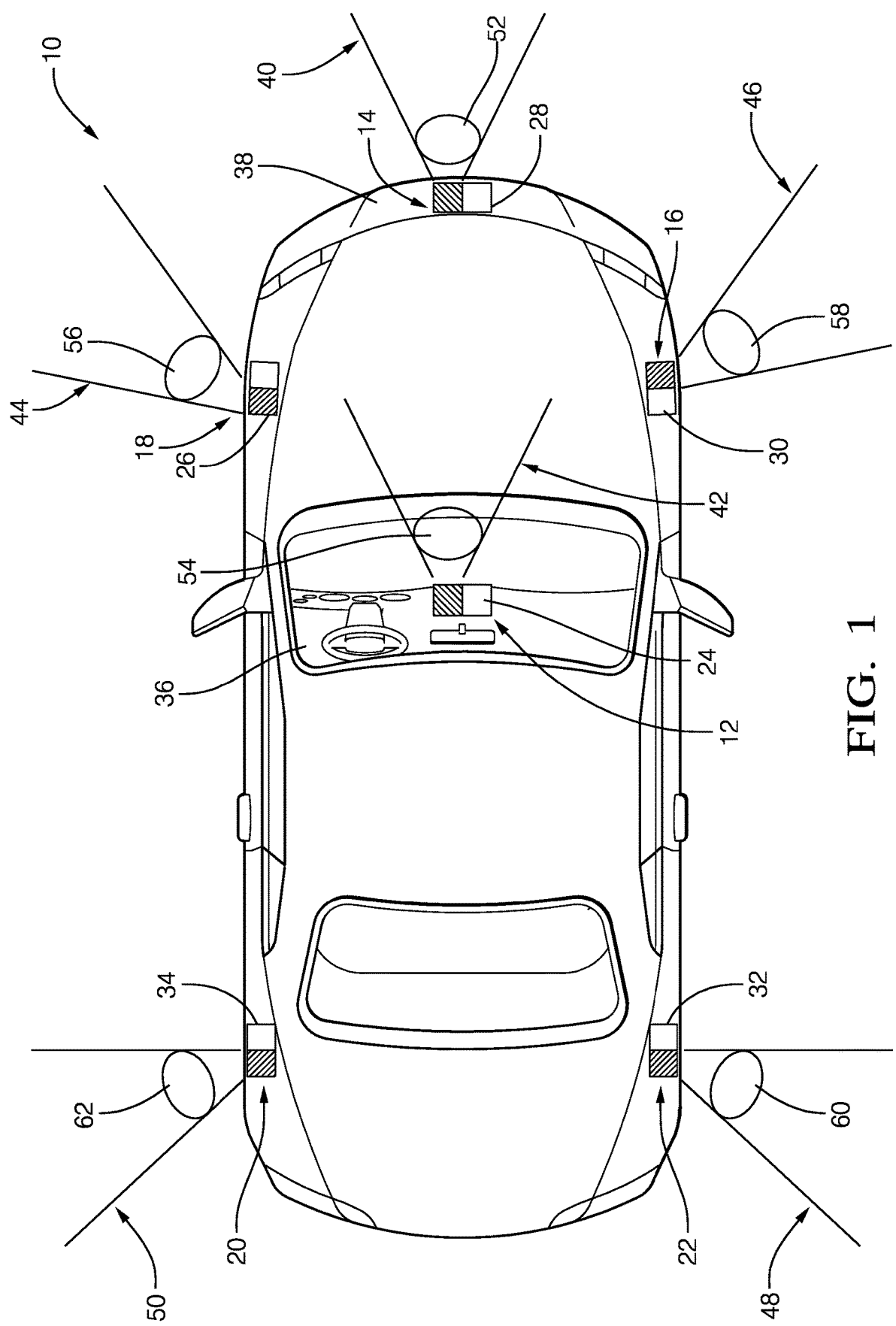
FIG. 1 is a top view of a vehicle equipped with a detection-system according to the invention.

According to FIG. 1, a vehicle 10 is represented. The vehicle 10 is equipped with a plurality of detection-systems 12, 14, 16, 18, 20, 22 which detect an object or objects surrounding the vehicle 10. Each detection-system 12, 14, 16, 18, 20, 22 comprises a module-housing 24, 26, 28, 30, 32, 34 equipped with a radar sensor. The radar sensors are part of a driver assistant system. Each detection-system 12, 14, 16, 18, 20, 22 is placed behind a body part 36, 38 of the vehicle 10 in order to be protected against outdoor conditions. As non-limitative example, the vehicle comprises a detection-system 14 placed in the middle of the non-visible side of the front bumper 38 which is dedicated to adaptive cruise control. Two detection-systems 16, 18 placed at the two front lateral positions of the vehicle are dedicated to cross-traffic alert. Two other detection-systems 20, 22 placed at the two rear lateral positions of the vehicle are dedicated to blind spot detection. Another detection-system 12 placed in the body compartment of the vehicle, on the windshield 36, is dedicated to pedestrian detection. Said another detection-system 12 may combine radar sensor and camera component for more accurate behavior. As non-limitative example, each radar sensor emits a radar beam 40, 42, 44, 46, 48, 50 and receives reflected beam toward a detected obstacle. This mode is called a detection mode. Each radar sensor emits a radar beam 40, 42, 44, 46, 48, 50 passing through the body part 36, 38 of the vehicle 10 and has a predetermined field of view. The field of view 52, 54, 56, 58, 60, 62 of each detection-system 12, 14, 16, 18, 20, 22 is adapted for a predetermined function.

Figure 2:
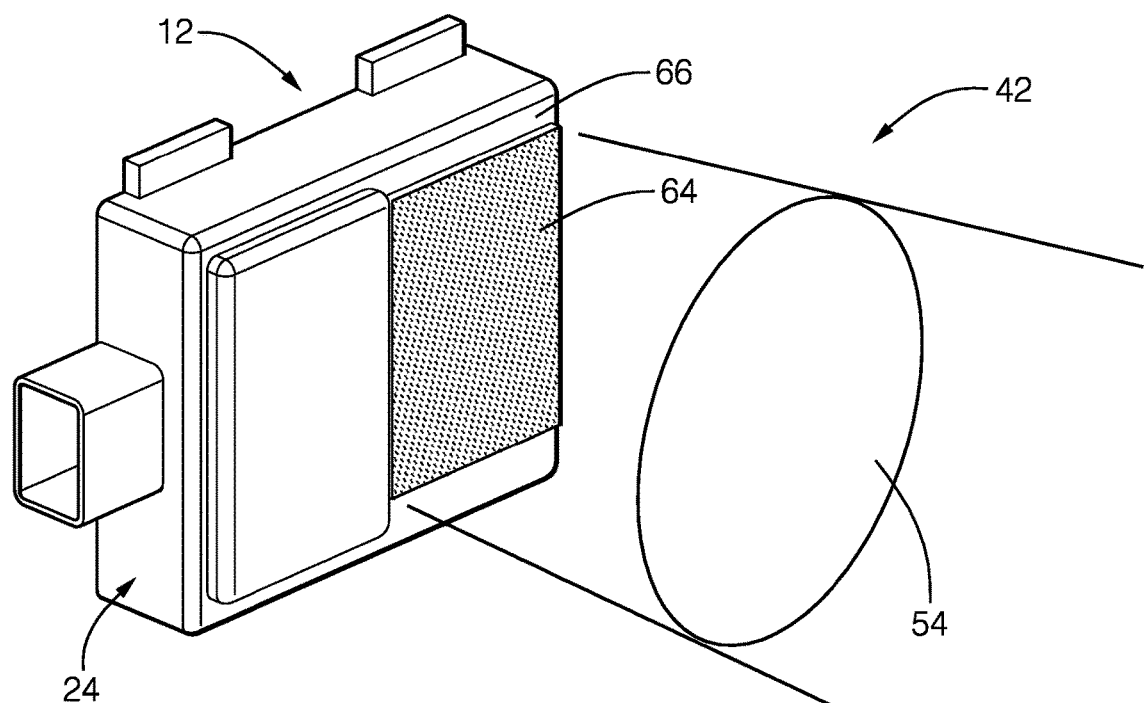
FIG. 2 is a perspective view of the detection-system according to one embodiment of the invention wherein the absorber material is placed on the module-housing.

According to FIG. 1 and FIG. 2, each module-housing 24 is equipped with an absorber material 64. The absorber material 64 absorbs a predetermined high frequency signal emitted by the radar sensor such that it warms up. The emission of the predetermined high frequency signal to warm up the absorber material 64 is called the defrost mode. The absorber material 64 may be a foil that absorbs the energy of the high frequency signal. The predetermined high frequency signal is called a defrost beam 68 as the warmed up absorber material 64 is used to heat the body part 36 of the vehicle 10 through which the radar beam 42 is passing and on which snow, ice or water rain may obstructs the radar signal. The absorber material 64 is placed on one outer surface 66 of the module-housing 24 and in the field of view 54 of the radar beam 42. To be efficiently warmed up, the absorber material 64 is also placed in the field of view 70 of the defrost beam 68. The radar beam field of view 54 and the defrost beam field of view 70 are almost similar. To efficiently defrost the body part 36 of the vehicle 10 through which the radar beam 42 passes, the absorber material 64 is thermally coupled with said body part 36 of the vehicle 10. Generally, the absorber material 64 may be glued with thermal conductive glue on the body part 36 of the vehicle 10. Such embodiment is useful to melt and remove ice, snow or water rain from the field of view of the radar beam 42 such that it is not distorted and provide accurate information to the driver assistant system.

Figure 3:
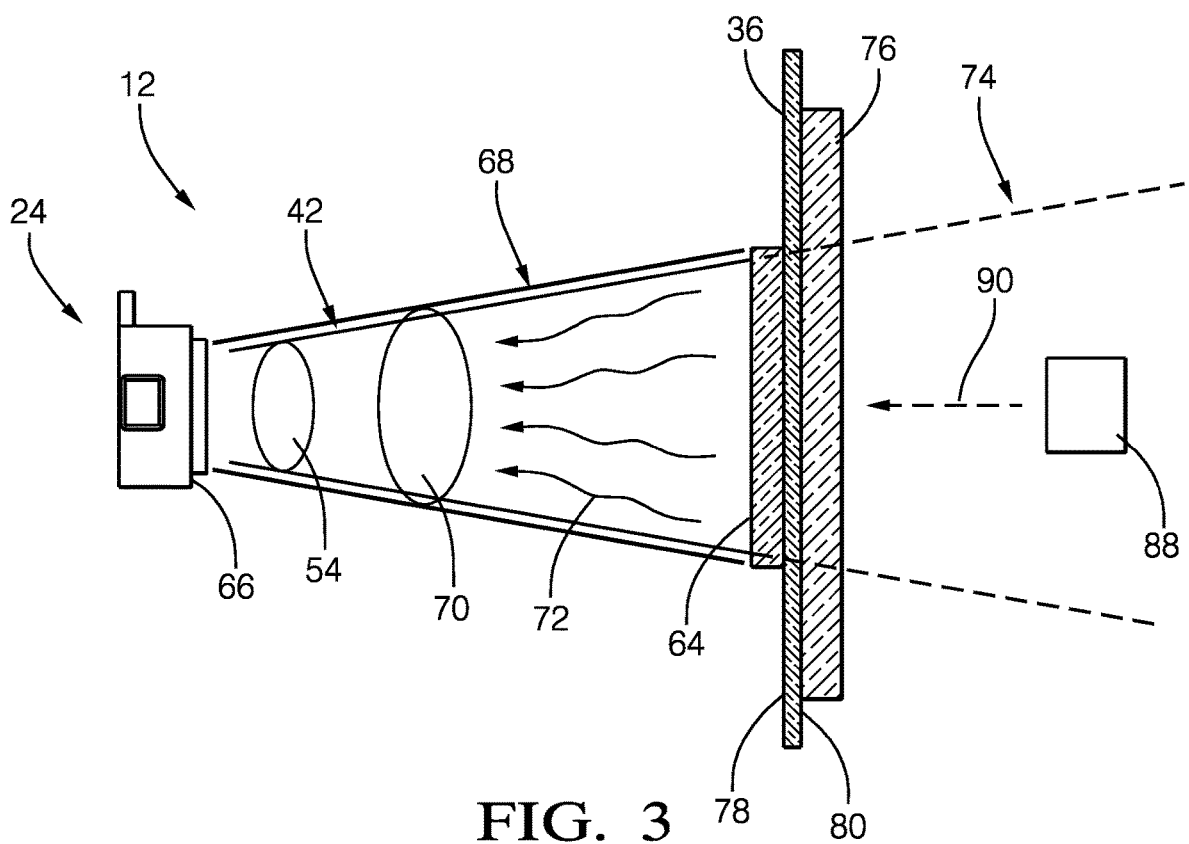
FIG. 3 is a perspective view of the detection-system according to another embodiment of the invention wherein the absorber material is placed remotely from the module-housing and illustrating the beginning of the defrost mode.
Figure 4:
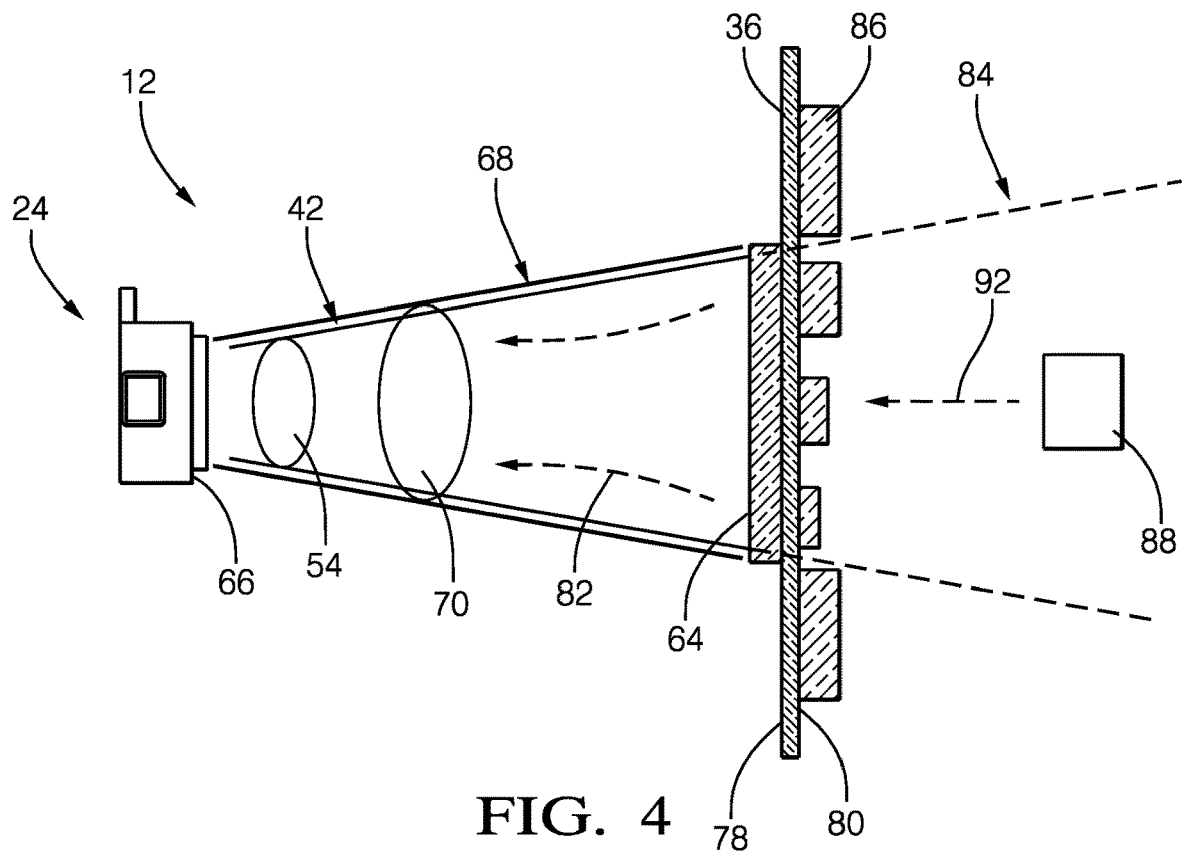
FIG. 4 is a perspective view of the detection-system according to the embodiment of FIG. 3 and illustrating the operation of the defrost mode.
Figure 5:
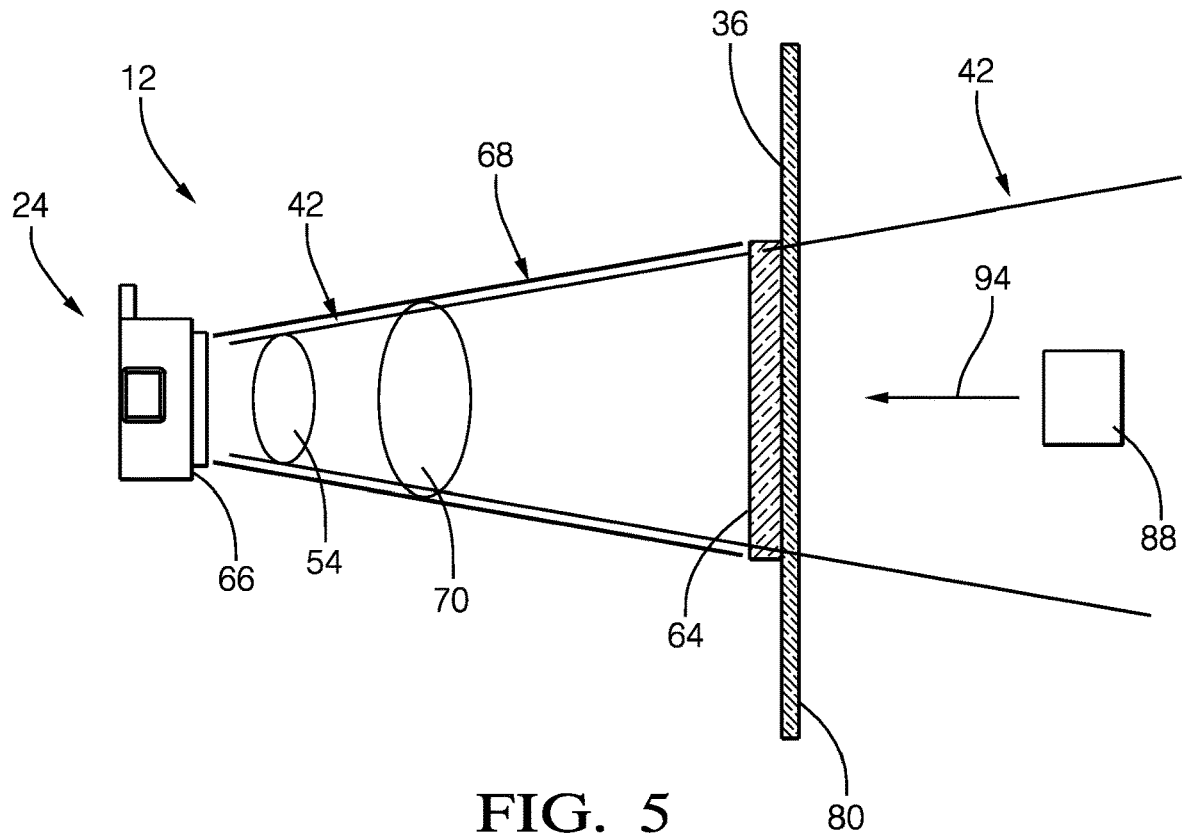
FIG. 5 is a perspective view of the detection-system according to the embodiment of FIG. 3 illustrating the end of the defrost mode.

According to FIGS. 3, 4 and 5, an alternative embodiment is represented. The absorber material 64 is thermally coupled to the body part 36 of the vehicle 10 and the module-housing 24 is located remotely from the absorber material 64. The absorber material 64 is placed on the inner surface 78 of the body part 36 of the vehicle 10 which is the surface of the body part 36 not exposed to the outdoor conditions. It is obvious that the invention may combine a plurality of detection-systems 12 wherein the absorber material 64 is placed on the outer surface 66 of some module-housings 24 and detection-systems 12 wherein the absorber material 64 is placed remotely from some other module-housings 24. In any case, the absorber material 64 is always thermally coupled with the body part 36 of the vehicle 10 through which the radar beam 42 passes.

FIGS. 3, 4, and 5 represent the progress of the defrost mode from the beginning to the end. In such progress, the defrost mode may be activated simultaneously or separately from the detection mode. The operation wherein the detection mode is activated simultaneously with the defrost mode is called a combined defrost and detection mode.

According to FIG. 3, a beginning of the defrost mode is illustrated. It is clear that in case of presence of frost or moisture 76 as snow, ice, or water rain, on the outer surface 80 of the body part 36 of the vehicle 10 which is the surface of the body part 36 exposed to the outdoor conditions, the radar beam 42 passes through the absorber but does not correctly pass through the body part 36. A huge part of the radar beam 72 is reflected toward the moisture 76 and a minor part of the radar beam 74 passes through the body part 36 may reflect on an object 88. The combination of the radar beam reflected 72 by the moisture 76 and the radar beam 90 reflected by the object 88 can generate a distortion of the reflected radar beam 72 processed by the detection-system 12 and can provide false information to the detection-system 12. In that situation, the defrost mode is activated. It may be activated automatically or manually. The defrost beam 68 is activated and it is absorbed by the absorber material 64. The defrost beam do not pass through the body part 36 of the vehicle 10. It may happen that some minor energy of the defrost beam may pass through the body part 36.

Alternatively, the absorber material 64 may also be located on the outer surface of the body part 36 of the vehicle 10.

According to FIG. 4, the defrost mode is in operation. The defrost beam 68 is still absorbed by the absorber material 64. The moisture 86 on the outer surface 80 of the body part 36 of the vehicle 10 is reduced as the absorber material 64 is warmed up due to the absorption of the defrost beam 68. The reduction of the moisture 86 causes less reflected radar beam 82 compared to FIG. 3 and a significant part of the radar beam 84 passes through the reduced amount of the moisture 86. However, as there is still non negligible amount of reflected radar beam 82, the combination of the reflected radar beam 82 reflected by the moisture 86 and the radar beam 92 reflected by the object 88 can generate a little distortion of the reflected radar beam processed by the detection-system 12 and can provide inaccurate information to the detection-system 12. It has to be admitted that the situation is already improved in comparison with FIG. 3.

According to FIG. 5, the defrost mode is at the end of the operation. The defrost beam 68 is still absorbed by the absorber material 64. The snow, ice or moisture 76 on the outer surface 80 of the body part 36, has been completely removed. The radar beam 42 does not suffer any more of reflected signal through moisture. The radar beam 42 is not any more distorted by such moisture 76. The radar beam 94 reflected by the object 88 and processed by the detection-system 12 may provide accurate information on the object 88. Then, the defrost mode may be deactivated.

Figure 6:
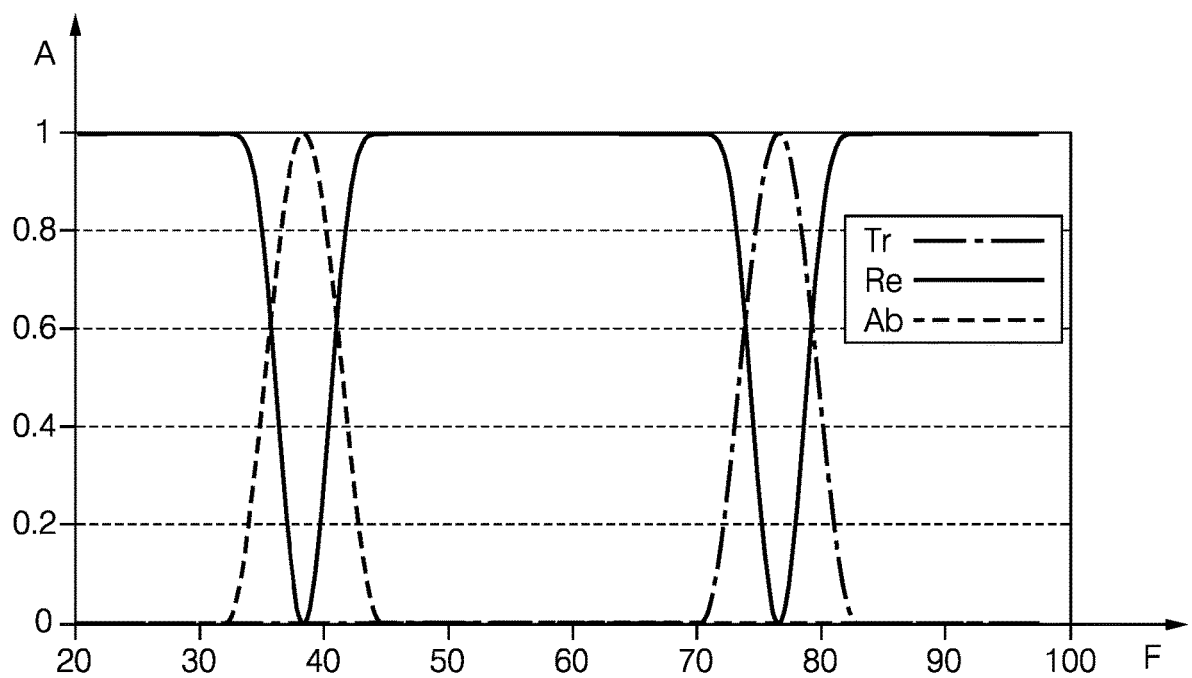
FIG. 6 is a graph illustrating high frequency characteristics of the absorber material of the detection-system of the invention.

FIG. 6 shows a non-limitative example of an ideal high frequency characteristics chart of the absorber material 64. The x-axe F is the frequency of the signal in gigahertz and the y-axe A is the relative characteristic of the absorber material. According to the absorption characteristics Ab, the absorber material 64 absorbs a signal at a frequency of 38.25 gigahertz. According to the transmission characteristics Tr, the absorber material 64 lets a signal frequency passing through without reflection at a frequency of 76.5 gigahertz. Thus the reflection characteristic Re of the absorber material 64 shows that the absorber material 64 has no reflections at 38.25 gigahertz and at 76.5 gigahertz. According to one embodiment of the invention, and according to the characteristics of the absorber material, the radar beam 42 is typically a high signal frequency at 76.5 gigahertz and the defrost beam 68 is a high frequency signal having half of the frequency of the radar beam signal, i.e. 38.25 gigahertz. The absorber material 64 is a metamaterial. Metamaterials are materials engineered to have properties that have not yet been found in nature. They are made from assemblies of multiple elements fashioned from composite materials such as metals or plastics. The materials are usually arranged in repeating patterns, at scales that are smaller than the wavelengths of the phenomena they influence. Metamaterials derive their properties not from the properties of the base materials, but from their newly designed structures. Their precise shape, geometry, size, orientation, and arrangement gives them their smart properties capable of manipulating electromagnetic waves by blocking, absorbing, enhancing, bending waves, to achieve benefits that go beyond what is possible with conventional materials.

Figure 7:
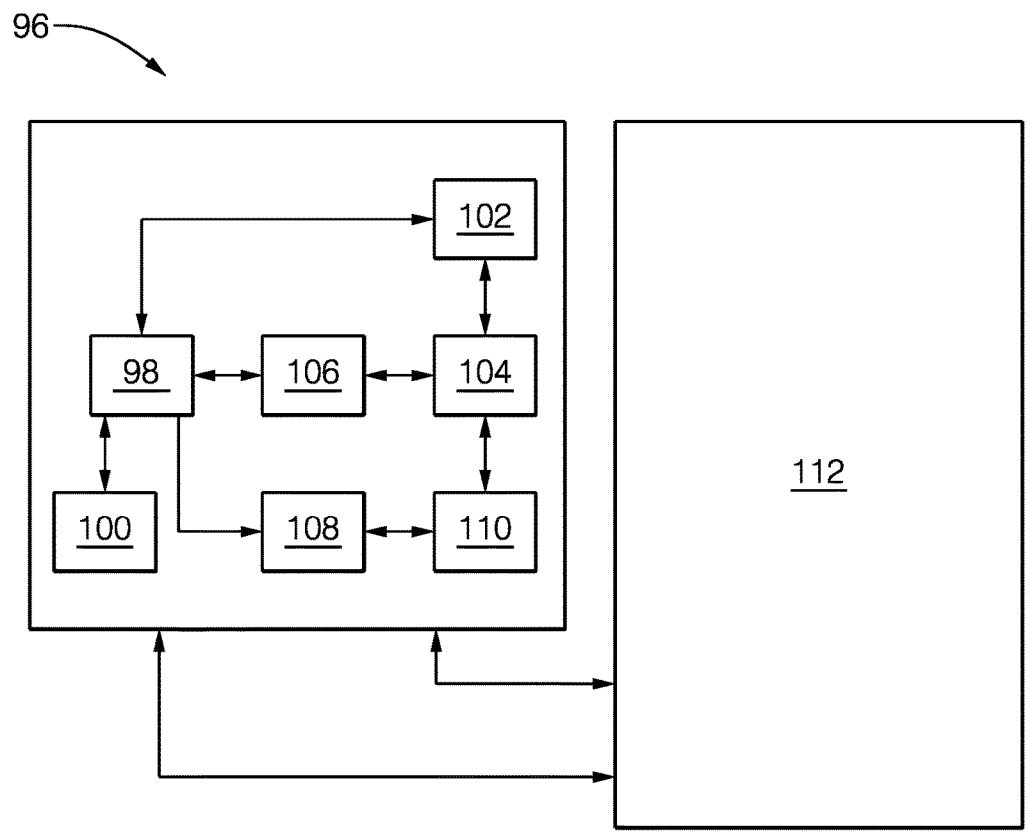
FIG. 7 is an electronic block diagram of the module-housing of the detection-system of the invention.

According to FIG. 7, the module-housing 24 comprises the radar sensor 96 having a radar transceiver 98 coupled to an antennas array 100. The transceiver 98 and the antennas array 100 operate to transmit high frequency signals within the desired coverage zone or beam and to receive reflected radar signals reflected from objects within the coverage zone. The transceiver 98 comprises frequency divider in order to be able to emit different high frequency for multiple applications as radar application and defrosting application. The antennas array 100 includes several transmit antenna matched at different frequencies in order to emit radar beam and defrost beam on different transmit antenna. One example of radar beam frequency is 76.5 gigahertz while the defrost beam frequency is half of that value. The other parts of the radar sensor, such as an analog to digital converter 102, a programmable logic device 104, a switch driver 106, a linearizer 108, and a waveform generator 110 are arranged as commonly arranged in a radar sensor 96.

The module-housing comprises a microcontroller 112 for controlling the radar sensor component 96. More particularly, the microcontroller 112 is in charge of digitized samples of the received reflected radar signals from the radar sensor 96. The microcontroller 112 processes the received radar signal and provides various radar functions. In addition, the microcontroller 112 is controlling the operating mode of the radar sensor component. It may configure the radar sensor 96 in a radar sensor mode such that only the radar beam is emitted by the radar sensor component 96. It may configure the radar sensor component 96 in a defrost mode such that only the defrost beam is emitted by the radar sensor component 96. It may also configure the radar sensor in the combined defrost and detection mode. This combined mode may be used as an emergency mode, wherein both detection mode and defrost mode are activated simultaneous. During said emergency mode, the detection mode may work with lower accuracy while the defrosting works as radar beam may be distorted.

Figure 8:
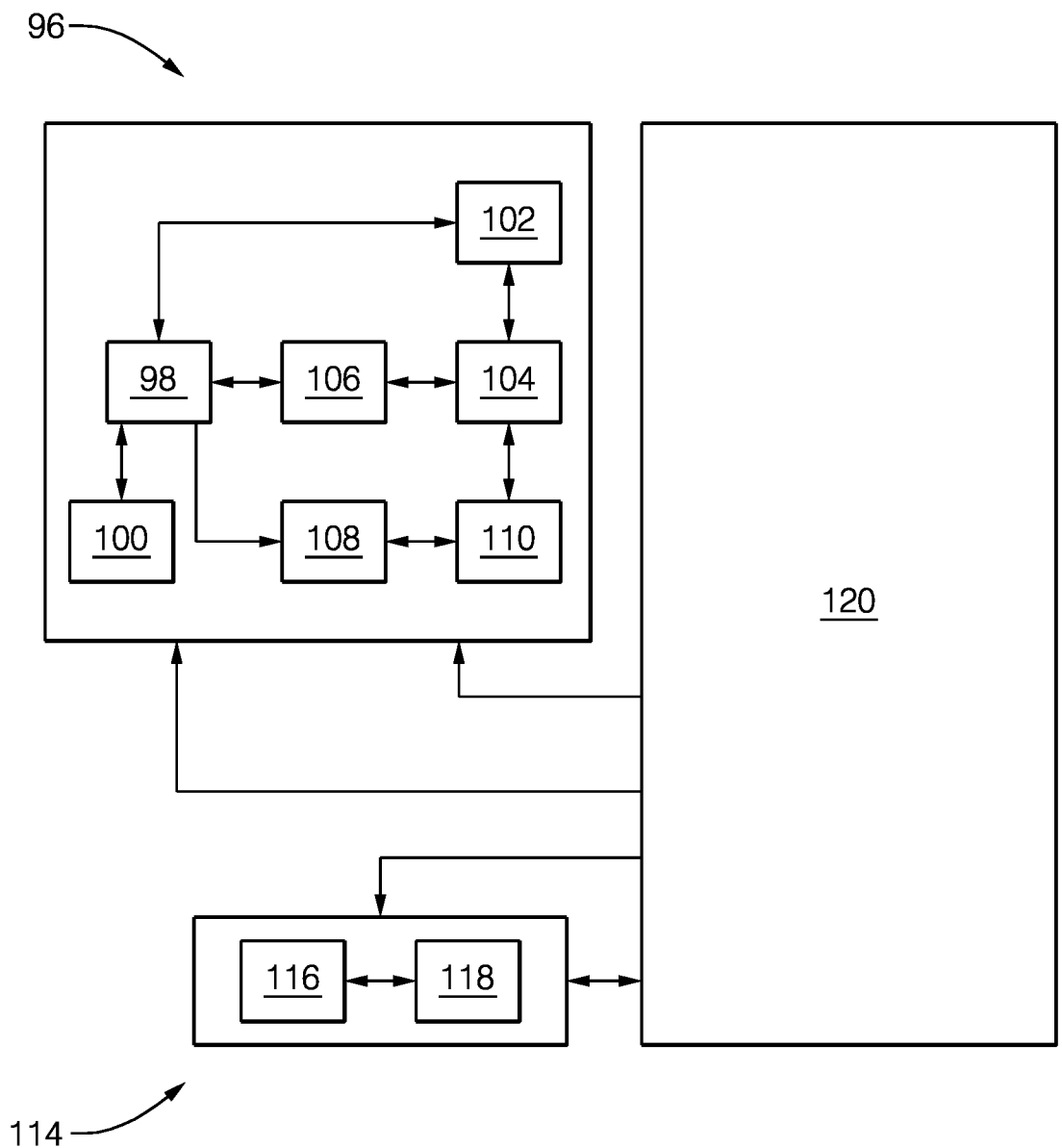
FIG. 8 is an electronic block diagram of the module-housing of the detection-system further comprising a camera component.

According to FIG. 8, the module-housing 24 comprises the same radar sensor component 96. It further comprises a camera component 114. The camera component 114 includes optics 116 and imager 118. FIG. 8 represents an alternative of FIG. 7, wherein the location of the module-housing 24 is behind a window as generally the windshield 36. The absorber material 64 is in the field of view of the camera component 114 and has to be translucent. The module-housing 24 comprises a video-microcontroller 120 that has additional features in comparison with the microcontroller 112 previously described according to FIG. 6. It should be appreciated that the camera component 114 may include a commercially available off the shelf camera for generating video images. The video-microcontroller 120 controls the radar component 96 and the camera component 114 and includes receiving images from the camera component and digitized samples of the received reflected radar signals from the radar component. The video microcontroller may process the received radar signals and camera images and provide various radar and vision functions. For example, the radar functions executed by video-microcontroller 120 may include radar detection, tracking, and threat assessment, each of which may be implemented via a routine or algorithm. Similarly, the video-microcontroller 120 may implement vision functions including lane tracking, vehicle detection, and pedestrian detection, each of which may be implanted via routines or algorithms. It should be appreciated that the video-microcontroller 120 may perform various functions related to either radar or vision utilizing one or both of the outputs of the radar sensor component 96 and camera component 114. More particularly, according to the invention, the camera component 114 is supervising the progress of the defrosting of the windshield 36.

Figure 9:
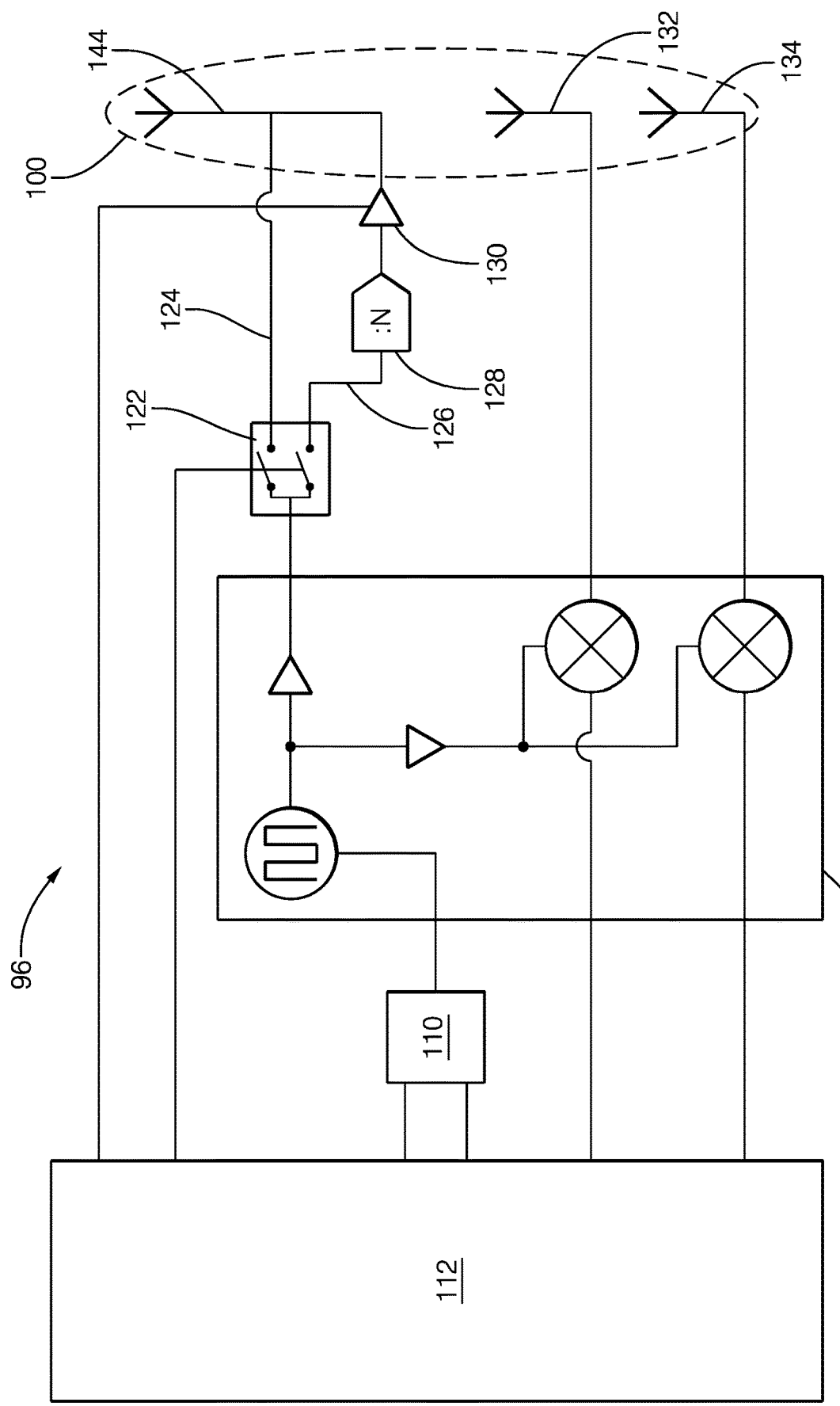
FIG. 9 is a detailed electronic block diagram of the module-housing illustrating a control method for the defrost mode and for the detection mode.
Figure 10:
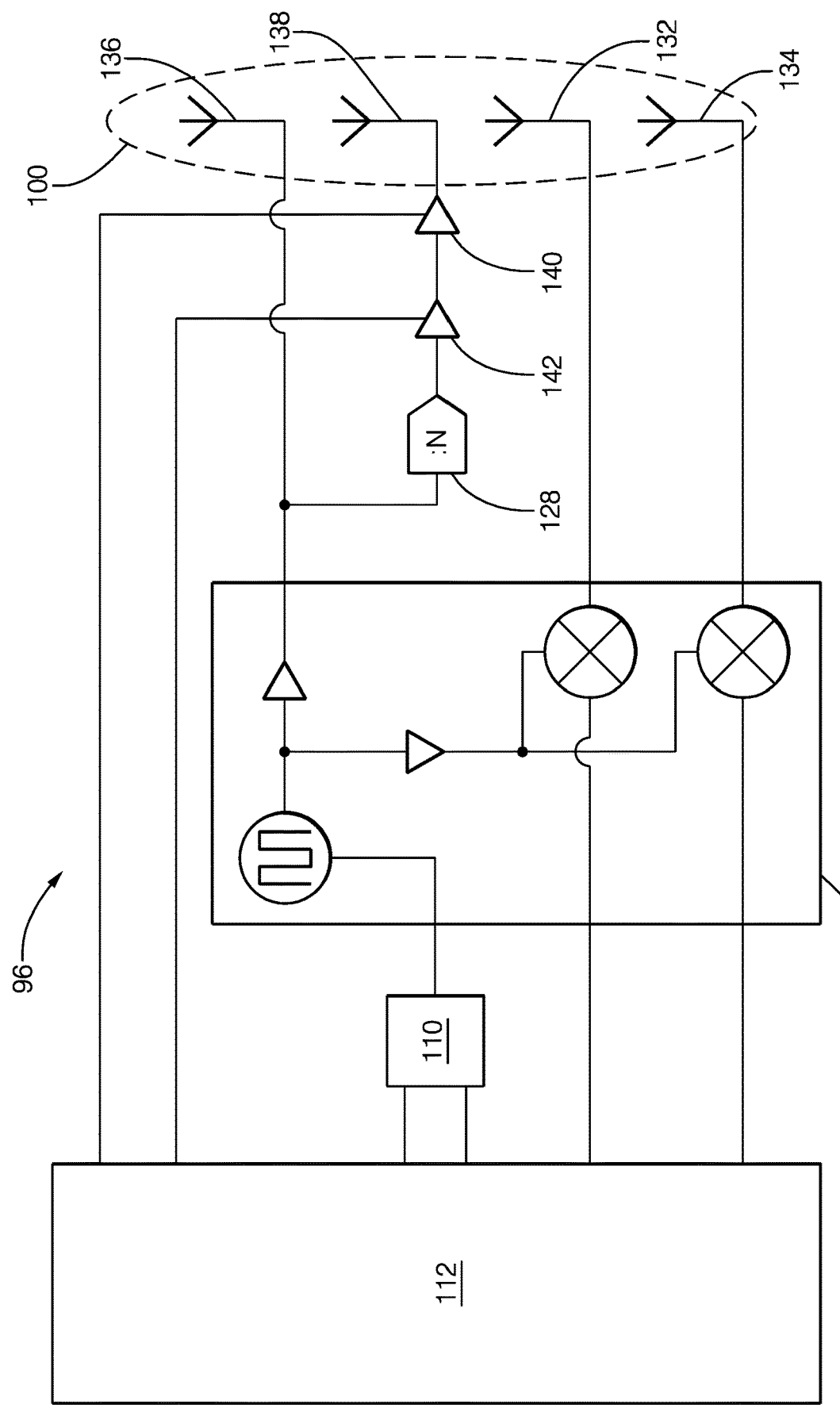
FIG. 10 is a detailed electronic block diagram of the module-housing illustrating another control method for the defrost mode and for the detection mode.

According to FIG. 9 and FIG. 10, two embodiments for the sensor component 96 are provided. Those figures represent detailed electronic block diagram of the module-housing 24 wherein only the microcontroller 112, the waveform generator 110, the radar transceiver 98, and the antennas array 100 are represented. The represented block diagrams illustrate the generation of the defrost beam 68 and the radar beam 42.

According to FIG. 9, a common antenna 144 is used for emitting the radar beam 42 and the defrost beam 68. In such situation, radar beam 42 is not transmitted simultaneously than defrost beam 68. A switch 122 controlled by the microcontroller 112 is placed at the output of the radar transceiver 98. The switch 122 selects a direct path 124 to the common antenna 144 or an indirect path 126 to a radar frequency divider 128. The radar frequency divider 128 is then connected to a high frequency amplifier 130 which is connected to the common antenna 144. The direct path 124 is the path of the high frequency radar signal while the indirect path is the path of the high frequency defrost signal. Two receipt antenna 132, 134 connected to the microcontroller 112 via the radar transceiver 98 receive reflected radar beam toward a detected obstacle, e.g. the object 88. Alternatively, the switch 122 and the radar frequency divider 128 may be integrated within the radar transceiver 98.

According to such embodiment, a control method of the detection-system 12 may be defined. As a first step, the defrost mode may be activated by the microcontroller 112. The microcontroller 112 generates signals that go to the waveform generator 110. The output of the waveform generator 110 is connected to the transceiver 98 such that a high frequency signal that is the radar signal is obtained. The controller controls the switch 122 such that the high frequency radar output signal of the transceiver 98 is directed to the radar frequency divider 128. The radar frequency divider 128 transforms the radar input signal into a lower high frequency which is the defrost signal. Generally, the radar divider use a ratio of two such that the defrost beam 68 is a high frequency signal having half of the frequency of the radar beam 42 signal. For efficiency of the defrost mode, the defrost signal is amplified by high frequency amplifier 130 and then transmitted in the air toward the absorber material 64 via the common antenna 144. The high frequency amplifier 130 is controlled by the microcontroller 112 such that it is only powered on during defrost mode.

As a second step, when the defrost mode is finished, the detection mode is activated. During such mode, the microcontroller 112 controls the switch such that the high frequency radar output signal of the transceiver 98 is directly directed to the common antenna 144. The common antenna 144 generates the radar beam 42 that is directed toward the object 88. During such mode, preferably, the high frequency amplifier 130 is switched off by the microcontroller 112. During the detection mode, the reflected radar beam by the object 88 is received by the two received antennas 132, 134, and directed to the microcontroller 112 by the transceiver 98. The transceiver 98 digitizes the reflected signal such that the microcontroller 112 is able to process such signal.

According to FIG. 10, two distinct transmit antennas 136, 138 are used. The transmit antenna directly connected to the radar transceiver 98 is the transmit antenna 136 for emitting the radar beam 42. The other transmit antenna 138 connected with two high frequency amplifiers 140, 142 in series and controlled by the microcontroller 112 is the transmit antenna 138 for emitting the defrost beam 68. The radar frequency divider 128 is directly connected on the output of the radar transceiver on one side and is connected in series with the two high frequency amplifiers 140, 142. In such configuration, the radar beam 42 and the defrost beam 68 may be transmitted simultaneously such that the combined defrost and detection mode may be activated. The progress of the defrosting may be supervised by the microcontroller 112 that may check the progress of the distortion of the reflected radar signal.

According to such embodiment, additional features of the control method of the detection-system 12 may be defined. The microcontroller may use a so called emergency mode wherein the defrost mode and the detection mode works simultaneously. For such control method, the microcontroller 112 switches on two high frequency amplifiers 140, 142 in series with the radar frequency divider 128. When the emergency mode is activated, one part of the radar signal is directed from the radar transceiver 98 to the transmit antenna 136 that generates the radar beam 42 while the other part of the radar signal from the output of the transceiver goes to the radar signal divider 128 that generates the defrost signal that goes to the other transmit antenna 138 to generate the defrost beam 68.

While this invention has been described in terms of the preferred embodiments thereof, it is not intended to be so limited, but rather only to the extent set forth in the claims that follow.

We claim:

1. A detection-system for a vehicle to detect the presence of one or more objects relative to the vehicle, said detection-system comprising:
   a module-housing; and
   a radar sensor component located within the module-housing for emitting a radar beam and receiving reflected signals in a detection mode, wherein
   the radar sensor component comprises means for emitting a separate defrost beam in a defrost mode, said separate defrost beam overlapping the radar beam, and
   the detection-system further comprising an absorber material located in the field of view of both the defrost beam and the radar beam to absorb the energy of the defrost beam and to warm up in view to provide a defrosting effect.

2. The detection-system according to claim 1, wherein the absorber material is arranged on an outer surface of the module-housing.

3. The detection-system according to claim 1, wherein the absorber material is a metamaterial that absorbs the defrost beam frequency and lets pass through the radar beam frequency.

4. The detection-system according to claim 1, wherein the means for emitting a defrost beam comprises a radar frequency divider.

5. The detection-system according claim 1, wherein the module-housing is further comprising a microcontroller adapted to operate the radar sensor component in a detection mode, in a defrost mode or in a combined defrost and detection mode.

6. The detection-system according to claim 1, wherein the vehicle includes a body part, and the absorber material is thermally coupled to the body part.

7. The detection-system according to claim 6, wherein the body part of the vehicle is a bumper.

8. The detection-system according to claim 6, wherein the body part of the vehicle is a windshield.

9. The detection-system according to claim 1, wherein the absorber material is a translucent material.

10. The detection-system according to claim 1, wherein the module-housing comprises a camera component, and the absorber material is located in a field of view of the camera such that the camera component is supervising the progress of the defrosting.

11. The detection-system according to claim 1, wherein the radar beam and the defrost beam are emitted from different antennas.

12. The detection-system according to claim 1, wherein the radar beam and the defrost beam are emitted from a common antenna.

13. The detection-system according to claim 1, wherein the defrost beam and the radar beam are emitted at different frequencies.

14. The detection-system according to claim 1, wherein the defrost mode is activated separately from the detection mode.

15. The detection-system according to claim 1, wherein the defrost mode is activated simultaneously to the detection mode.

16. A control method for a detection-system, said method comprising the steps of:
  operating the detection-system in a radar mode by using a radar sensor component to emit a radar beam and to receive reflected radar beam signals; and
  operating the detection-system in a defrost mode by using the radar sensor component to emit a separate defrost beam toward an absorber material placed in the field of view of both the defrost beam and the radar beam and thermally coupled with a body part of a vehicle through which the radar beam passes, the separate defrost beam being suitable for warming up the absorber material and for providing a defrost effect on the body part.

17. The control method according to claim 16, wherein the method further comprises the step of
  operating the detection-system in a combined defrost and detection mode by using the radar sensor component to emit simultaneously the radar beam and the defrost beam.

18. The control method according to claim 16, wherein the defrost beam and the radar beam are emitted at different frequencies.

19. The control method according to claim 16, wherein the defrost mode is activated separately from the detection mode.

20. The control method according to claim 16, wherein the radar beam and the defrost beam are emitted from one of a common antenna and different antennas.

\* \* \* \* \*